(12) United States Patent
Obata et al.

(10) Patent No.: US 7,270,434 B2
(45) Date of Patent: Sep. 18, 2007

(54) INDICATOR LIGHTING DEVICE

(75) Inventors: Masato Obata, Niigata (JP); Naoji Shoji, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 16 days.

(21) Appl. No.: 10/546,559

(22) PCT Filed: Dec. 12, 2003

(86) PCT No.: PCT/JP03/16407

§ 371 (c)(1),
(2), (4) Date: Aug. 23, 2005

(87) PCT Pub. No.: WO2004/088251

PCT Pub. Date: Oct. 14, 2004

(65) Prior Publication Data

US 2006/0238993 A1   Oct. 26, 2006

(30) Foreign Application Priority Data

Mar. 28, 2003   (JP)   ............................. 2003-089447

(51) Int. Cl.
  *G01D 11/28*   (2006.01)
(52) U.S. Cl. ............................. 362/23; 362/29; 362/30
(58) Field of Classification Search .................. 362/23, 362/24, 27, 29, 30, 555
  See application file for complete search history.

(56) References Cited

U.S. PATENT DOCUMENTS 5,458,082 A * 10/1995 Cookingham ............... 116/288

(Continued)

FOREIGN PATENT DOCUMENTS

JP   55-80797   11/1953

(Continued)

OTHER PUBLICATIONS

Microfilm of the specification and drawings annexed to the request of Japanese Utility Model Application No. 163060/1978 (Laid-open No. 080797/1980) (Yazaki Corp.) Jun. 3, 1980.

(Continued)

*Primary Examiner*—John Anthony Ward
(74) *Attorney, Agent, or Firm*—McDermott Will & Emery LLP

(57) ABSTRACT

An indicator lighting device in which light introduction efficiency into a indication portion can be improved, brightness is good and unevenness in lighting is small is provided; wherein an indicator 7 which has a translucent indication member (indication portion) 72 and a light introduction member (light introduction portion) 73 and is operated around an axis by a drive shaft 1 of a drive unit 2, light sources L which are disposed around the drive shaft 1 and illuminate the indication member 72 through the light introduction member 73 are provided, and the light introduction member 73 has a light receiving surface 73*a* for receiving light from the light sources L, a first reflective surface 73*b* for focusing light introduced from the light receiving surface 73*a* to a position of a rotation axis $V_a$ of the drive shaft 1, a second reflective surface 73*c* which is formed between the first reflective surface 73*b* and the rotation axis and reflects light from the first reflective surface 73*b* in a direction along the rotation axis $V_a$, and a third reflective surface 73*d* which is formed on the rotation axis $V_a$ in a way of facing the second reflective surface 73*c* and reflects light from the second reflective surface 73*c* in a longitudinal direction of the indication member 72.

16 Claims, 4 Drawing Sheets

U.S. PATENT DOCUMENTS 5,546,888 A * 8/1996 Skiver et al. .............. 116/286
6,959,995 B2 * 11/2005 Ikarashi et al. ............ 362/23

FOREIGN PATENT DOCUMENTS

| | | |
|---|---|---|
| JP | 51-007109 | 2/1976 |
| JP | 03-048726 | 3/1991 |
| JP | 5-79434 | 10/1993 |
| JP | 8-43145 | 2/1996 |
| JP | 2001-330482 A | 11/2001 |
| JP | 2003-014503 | 1/2003 |
| JP | 2003-194592 | 7/2003 |

OTHER PUBLICATIONS

CD-ROM of the specification and drawings annexed to the request of Japanese Utility Model Application No. 024794/1992 (Laid-open No. 079434/1993) (Nippon Seiki Co., Ltd.), Oct. 29, 1993.

Microfilm of the specification and drawings annexed to the request of Japanese Utility Model Application No. 006115/1979 (Laid-open No. 105118/1980) (Toyota Motor Co., Ltd.) Jul. 22, 1980.

* cited by examiner

INDICATOR LIGHTING DEVICE

This application is a U.S. national phase application of PCT international application PCT/IB2004/015327, filed on Oct. 8, 2004, which in turn claims the benefit of Japanese Application No. 2003-354095, filed Oct. 14, 2003, the disclosures of which Applications are incorporated by reference herein.

TECHNICAL FIELD

The present invention relates to an indicator lighting device, which is applied to, for example, indicator instruments of vehicles, for lighting an indicator operated by a drive shaft of a predetermined drive unit.

BACKGROUND ART

As an indicator lighting device of this type, a device described in JP-A-8-043145 has been known. The indicator lighting device described in that literature has an indicator which comprises a translucent material and is operated around an axis with a drive shaft, and a plurality of light sources for illuminating the indicator, wherein the indicator has a light introduction portion for introducing light from the light sources formed therein, and the light sources are disposed on a moving track of the light introduction portion in a way of forming a circular shape around the drive shaft. The light introduction portion sequentially moves on respective light sources disposed in the circular shape, thereby light from the light sources is introduced into the light introduction portion, and an indication portion shines in a line.

However, since the indicator lighting device described in the patent literature is in a configuration where the light introduction portion sequentially moves on respective light sources, thereby light from the light sources is taken in into the indicator, light from the plurality of light sources can be only partially taken into the indicator. Therefore, there has been a problem in usability of the light from the light sources, and improvement in luminance of the indicator has been limited. Moreover, there has been an issue that in view of circumstances that the light introduction portion moves on the fronts of respective light sources as point light sources, a level of light taken into the light introduction portion is hard to be kept constant, and unevenness in illumination tends to occur.

Thus, the invention intends to provide an indicator lighting device in which light introduction efficiency into the indication portion is improved, brightness is good and unevenness in lighting is small.

DISCLOSURE OF THE INVENTION

To achieve the object, the invention is characterized in having an indicator which has a translucent indication portion and a light introduction portion and is operated around an axis by a drive shaft of a drive unit, light sources which are disposed around the drive shaft and illuminate the indication portion through the light introduction portion; wherein the light introduction portion has a light receiving surface for receiving light from the light sources, a first reflective surface for focusing the light introduced from the light receiving surface to a rotation axis position of the drive shaft, a second reflective surface which is formed between the first reflective surface and the drive shaft and reflects the light from the first reflective surface in a direction along the rotation axis, and a third reflective surface which is formed on the rotation axis in a way of facing the second reflective surface and reflects the light from the second reflective surface in a longitudinal direction of the indication portion.

Moreover, the invention is characterized in that the light receiving surface is formed in an annular form surrounding the rotation axis, and the first reflective surface and the second reflective surface are formed in a conical or polygonal shape surrounding the rotation axis.

Moreover, the invention is characterized in that the light introduction portion has a part having a reverse-V-shaped section that is line-symmetric with the rotation axis as a reference, the first reflective surface is formed on an outer wall face of the part while the second reflective surface is formed on an inner wall face of the part, and the third reflective surface is positioned at a front side of the first and second reflective surfaces.

Moreover, the invention is characterized in that the light introduction portion has a part having a reverse-W-shaped section that is line-symmetric with the rotation axis as a reference, the first reflective surface is formed on an outer wall face of the part while the second reflective surface is formed on an inner wall face of the part, and the third reflective surface is positioned at a rear side of the first and second reflective surfaces.

Moreover, the invention is characterized in that both the indication portion and the light introduction portion are formed by combining translucent, separate components.

Moreover, the invention is characterized in that the light introduction portion is connected to the drive shaft via a connection member.

Moreover, the invention is characterized in that a display panel is disposed behind the indicator, the light introduction portion is positioned at the front of the display panel together with the indication portion, and the periphery of them is covered with a cover having a light shielding effect.

BRIEF DESCRIPTION OF THE DRAWINGS

FIG. 1 is a section view of the major portion of an indicator lighting device;
FIG. 2 is a front view showing a simple indicator used in FIG. 1;
FIG. 3 is a front view of an indication portion used for the indicator in FIG. 1;
FIG. 4 is a front view of a light introduction portion used for the indicator in FIG. 1;
FIG. 5 is a side view of the light introduction portion of FIG. 4;
and
FIG. 6 is a section view of the major portion of the indicator showing a light introduction channel.

BEST MODE FOR CARRYING OUT THE INVENTION

Hereinafter, embodiments of an indication device according to the invention are described according to accompanied drawings.

Figure 1:
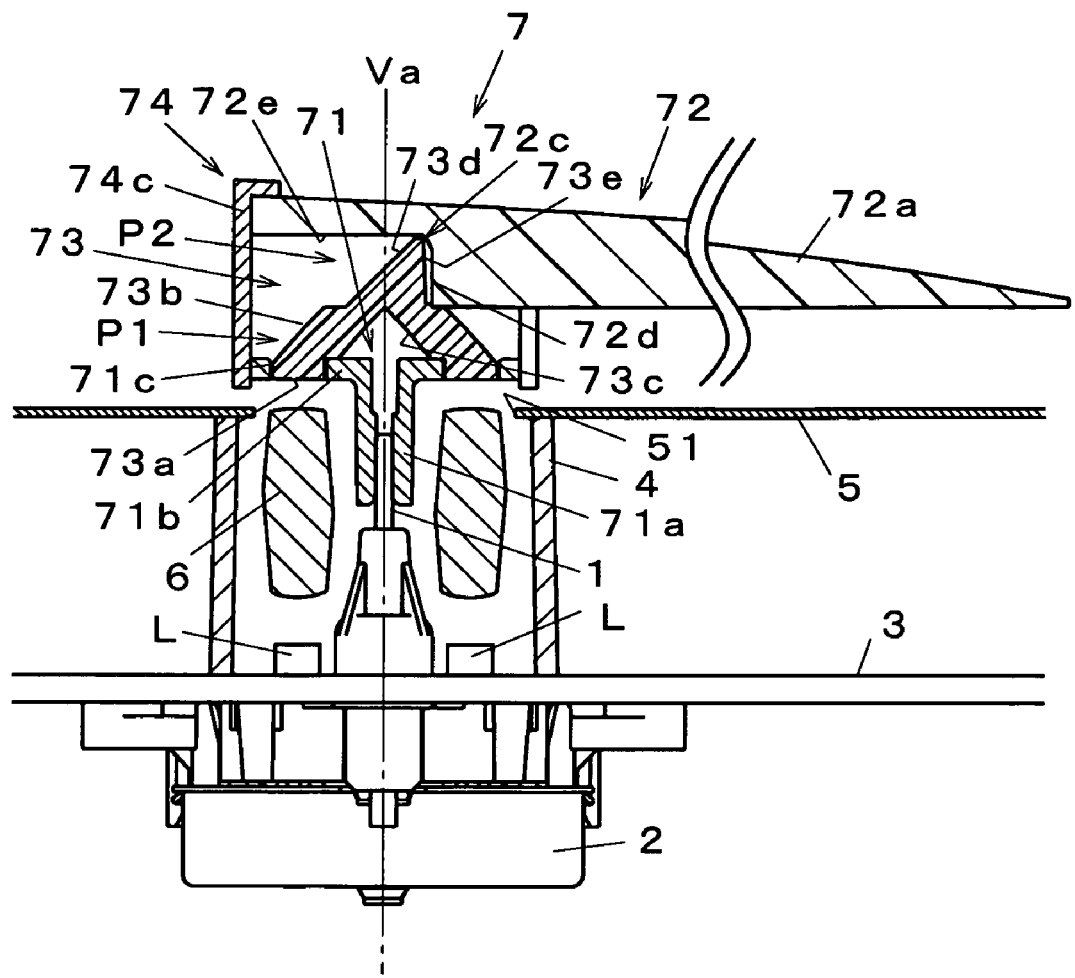
FIG. 1 to FIG. 6 show a first embodiment of the invention.

In FIG. 1, an indicator instrument has a drive unit 2 having a drive shaft 1 jutting forward therefrom, a circuit board 3 positioned at a front side of the drive unit 2, a cylindrical body 4 disposed at a front side of the circuit board 3, a display panel 5 supported by the cylindrical body 4, an light guide member 6 disposed inside the cylindrical body 4, an indicator 7 positioned on the display panel 5 and actuated around an axis by the drive shaft 1, and light sources L positioned behind the display panel 5 and disposed inside the cylindrical body 4.

The drive unit 2 comprises a well known coil motor such as stepping motor gage or air-core gage and is mounted on a back of the circuit board 3 in a way that the drive shaft 1 runs through the circuit board 3.

The circuit board 3 comprises a known, hard printed-circuit-board, and has a not-shown circuit pattern for supplying power to the drive unit 2 and the light sources L.

The cylindrical body 4 is formed cylindrically using, for example, white synthetic resin having a high light reflectivity, and contains respective components of the drive shaft 1, light sources L, and optical light member 6 within the body. Here, the light sources L comprise, for example, light emitting diodes of a surface mounting type, and a plurality of light sources L are disposed at an approximately equal interval around the drive shaft 1 and along a moving track of a later-described light introduction portion, and an arrangement configuration of them appears an arcuate shape with the drive shaft as a center.

The display panel 5 comprises a well known printed display panel, and has a not-shown portion of index such as scale, character and mark. The display panel 5 has a through-hole 51 that enables connection between the drive shaft 1 and the indicator 7, and the through-hole 51 has a shape of a circle along an inner diameter of an opening end of the cylindrical body 4, and has an opening diameter slightly smaller than the opening end of the cylindrical body 4.

The light guide member 6 is formed in a cylindrical shape which surrounds the drive shaft 1 and extends along the rotation axis $V_a$ of the drive shaft 1 using translucent synthetic resin such as acrylic resin or polycarbonate, and has a function of converging light radiated from the light sources L and transmitting the light to the later-described light introduction portion of the indicator 7.

The indicator 7 has a connection member 71 connected to the drive shaft 1; an indication member (indication portion) 72 for indicating the index portion of the display panel 5; a light introduction member (light introduction portion) 73 which is positioned between the indication member 72 and the connection member 71, and introduces light from the light sources L into the indication member 72; and an indicator cover (cover) 74 which covers the periphery of a rotation base of the indication member 72 and the light introduction member 73 with a certain portion of the indication member 72 being exposed.

The connection member 71 is formed to have an approximately T-shaped section having a boss 71a that is inserted into and coupled with the drive shaft 1, and a disk-shaped base 71b that extends from the front of the boss 71a in a direction intersecting with (perpendicular to) the rotation axis $V_a$, using, for example, appropriate synthetic resin having a light shielding effect. In the base 71b, a translucent portion 71c having a through-hole shape in this case is formed for transmitting the light from the light sources L to the light introduction member 72.

Figure 3:
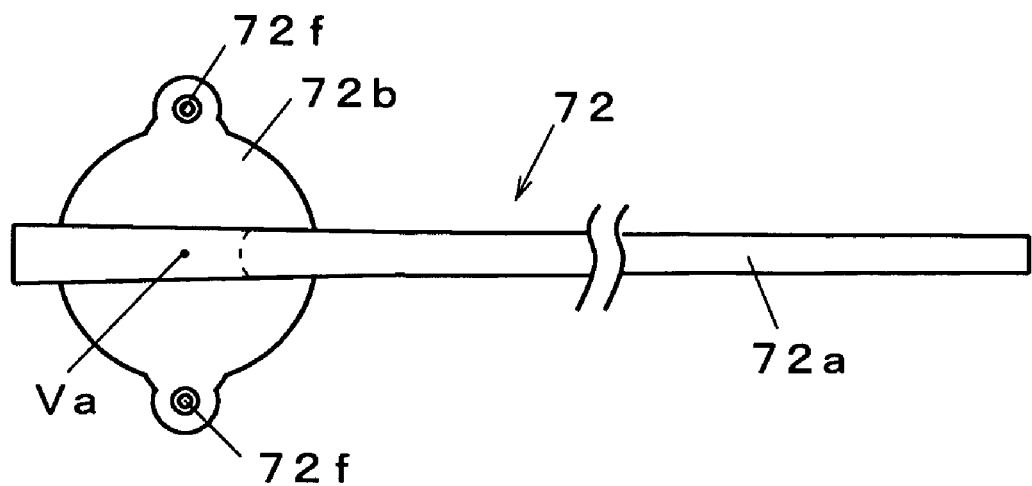

The indication member 72 comprises the translucent synthetic resin such as acrylic resin or polycarbonate, and has an indicator portion 72a extending linearly (longitudinally) in the direction intersecting with (perpendicular to) the rotation axis $V_a$ on the display panel 5, and a flange portion 72b (see FIG. 3) extending from sides of the indicator portion 72a in a disk pattern.

A step portion 72c is formed behind the rotation base of the indicator portion 72a (see FIG. 6), and first and second indicator light receiving portions 72d, 72e for receiving light from the light introduction member 72 are formed on the step portion 72c. The first indicator light receiving portion 72d receives light irradiated in an approximate rotation axis $V_a$ direction through a later-described irradiated surface of the light introduction member 73; and the second indicator light receiving portion 73e receives light which transmits to a front side through first and third reflective surfaces of the light introduction member 72, which are described later; and when the light sources L emit light, the light is introduced through the light guide member 6 and the light introduction member 72, thereby the front of the indicator portion 72a exposed from the indicator cover 74 is illuminated brightly in a line. In the embodiment, while not shown, a reflective layer or a colored layer is formed on the front or the back of the indicator portion 72a.

On the other hand, in the flange portion 72b, holes 72f inserted with not-shown projections formed on the indicator cover 74.

The light introduction member 73 comprises the translucent synthetic resin such as acrylic resin or polycarbonate, and has an approximately conical first part (part) P1 surrounding the rotation axis $V_a$ with the axis as a reference (center), and an approximately semi-conical, second part P2 positioned at the front of a top face of the part P1 and on the rotation axis $V_a$.

The first part P1 is formed to have an approximately reverse-V-shaped section where a section profile is line-symmetry with the rotation axis $V_a$ as a reference; wherein a light receiving surface 73a for receiving the light from the light sources L which is irradiated from an output end of the light guide member 6, a first reflective surface 73b for focusing the light introduced from the light receiving surface 73a to a position of the rotation axis $V_a$, and a second reflective surface 73c which is formed between the first reflective surface 73b and the drive shaft 1 (rotation axis $V_a$) and reflects the light from the first reflective surface 73b in a direction along the rotation axis $V_a$ are formed.

In the case of the example, the light receiving portion 73a is formed in an annular or an arcuate shape surrounding the rotation axis $V_a$ (as a center axis) using an outer wall face at a back side of the first part P1; and both the first and the second reflective surfaces 73b, 73c are formed in a conical face surrounding the rotation axis $V_a$ (as a center axis) using an outer wall face and an inner wall face of the first part P1 in the form of reverse-V-shape, wherein a size of the second reflective surface 73c is set small compared with a size of the first reflective surface 73b, and they are opposed to each other. In the example, the first reflective surface 73b is set to be a curved surface that is slightly convex outward such that when it reflects light from the light receiving portion 73 in a direction of the second reflective surface 73c, it can focus the light directed to the second reflective surface 73c even in an extending direction of the rotation axis $V_a$. Accordingly, the first reflective surface 73b has a function of focusing the light directed to the second reflective surface 73c in radial and thrust directions of the rotation axis $V_a$. In this way, the light directed to the second reflective surface 73c is set to be focused even in the thrust direction of the rotation axis $V_a$, thereby height dimension of the light introduction member can be reduced. On the other hand, the second reflective surface 73c is set to have a flat section in the example, however, it may be set to have a curved section.

The second part P2 has an overall shape of approximately semi-conical form and a section profile which is formed to be approximately triangular, wherein a third reflective surface 73d for reflecting light from the second reflective surface 73c in a longitudinal direction (direction intersecting with or perpendicular to the rotation axis $V_a$) of the indication member 72 (indicator portion 72a) is formed on the rotation axis $V_a$ facing the second reflective surface 73c, and an irradiation surface 73e which faces the third reflective surface 73d and a first indicator light receiving portion 72d of the indicator portion 72a, and introduces light from the third reflective surface 73d in the longitudinal direction of the indication member 72 through the first indicator light receiving portion 72d is formed.

In the case of the example, the third reflective surface 73d is formed to be a conical surface using an outer wall face of the second part P2, and positioned at a front side of the first and second reflective surfaces 73b, 73c; and the irradiation surface 73e is formed to be a concave surface depressing to a third reflective surface 73d side. The first indicator light-receiving portion 72d is set to be a convex surface that is convex to an irradiation surface 73e side such that it conforms to the profile of the irradiation surface 73e.

Figure 4:
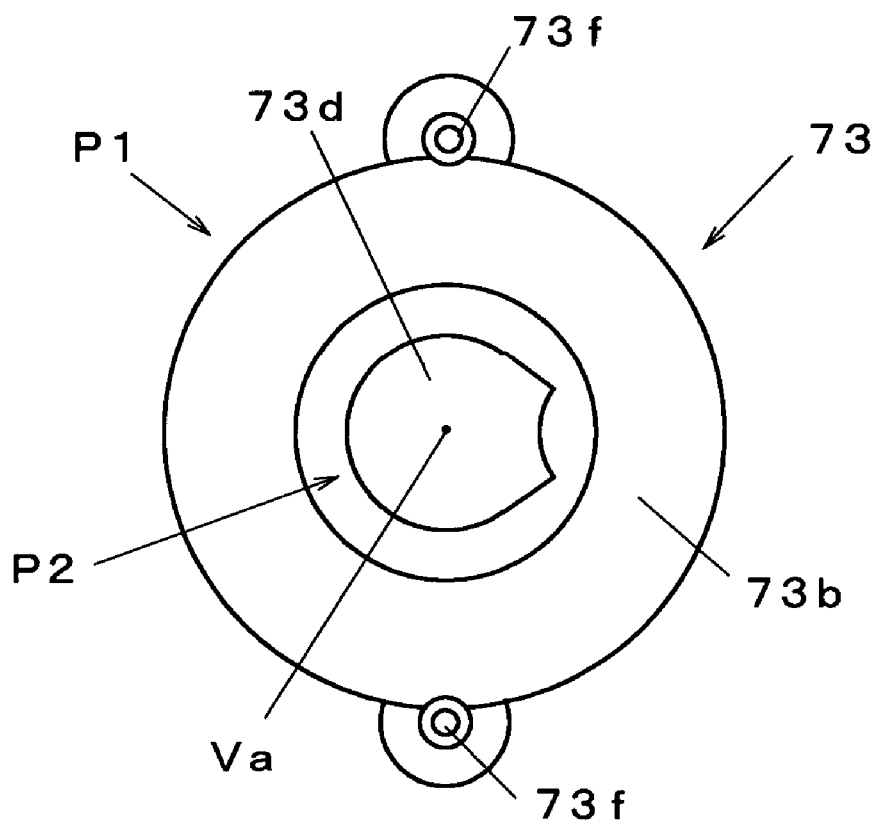
Figure 5:
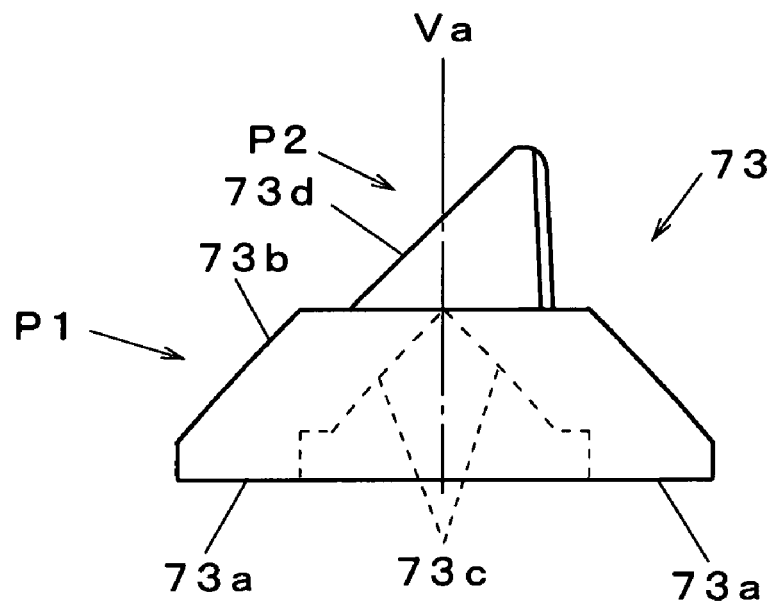

On outer circumferential portions of the first part P1, the holes 73f (see FIG. 4) inserted with the projections on the indicator cover 74 are formed.

Figure 2:
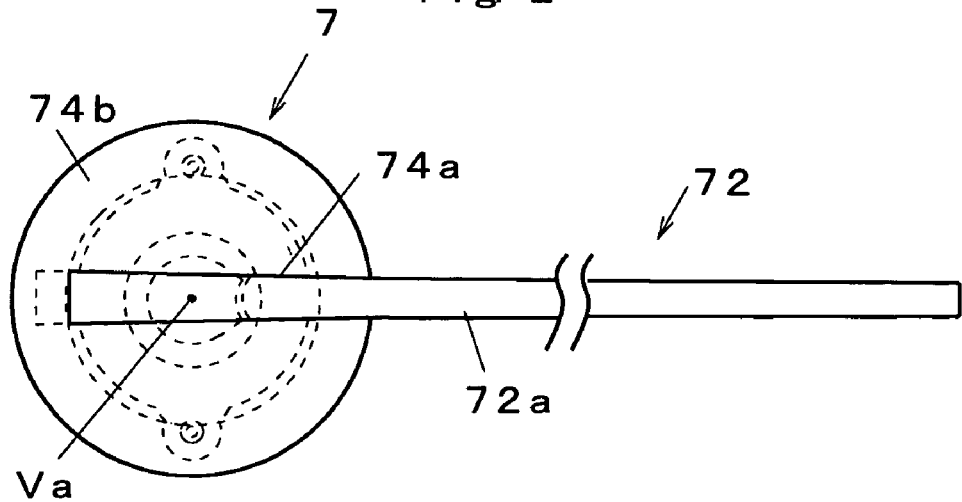

The indicator cover 74 comprises, for example, a black, synthetic resin material having a light shielding effect, and is formed to be an approximately cup shape having a slit 74a (see FIG. 2) for exposing the front of the indication member 72 (indicator portion 72a), a bottom wall portion 74b and a circumferential wall portion 74c for covering the periphery of the rotation base of the indication member 72 and the light introduction member 73.

The connection member 71, indication member 72, light introduction member 73, and indicator cover 74 configured in this way are unified by inserting the projections on the indicator cover 74 into the respective holes 72f, 73f in the indication member 72 and the light introduction member 73 and not-shown holes formed in the connection member 71 and welding the projections to the holes, to form the indicator 7, which rotates around an axis according to the drive shaft 1 to indicate the index portion of the display panel 5.

Figure 6:
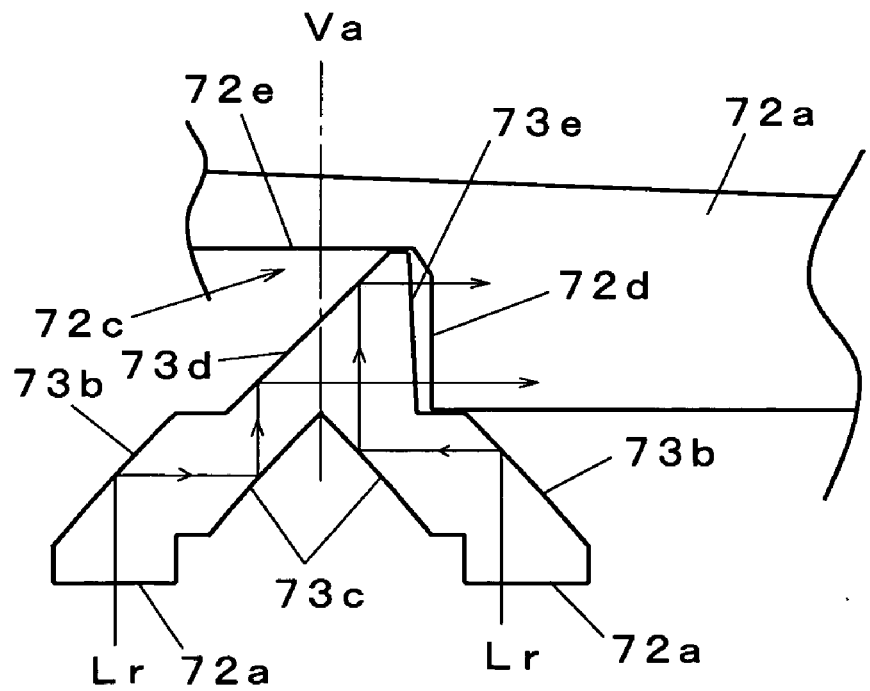

Next, a channel for introducing light into the indicator 7 in the case that the light sources L emit light is described in detail according to FIG. 6. In FIG. 6, the light sources L and the light introduction member 6 are omitted, and a beam Lr is light from the light sources L advancing via the light introduction member 6.

First, the beam Lr is taken into the light introduction member 73 through the light receiving portion 73a, and then reflected by the first reflective surface 73b to a position of the rotation axis $V_a$ (in a direction perpendicular to (intersecting with) an extension direction of the rotation axis $V_a$), and led to the second reflective surface 73c. At that time, the light receiving portion 73a is set such that it can receive all the light from the light sources L, and the light received in this way is reflected by the conical, first reflective surface 73b surrounding the rotation axis $V_a$, thereby focused from the outside of the light introduction portion 73 near the center (the rotation axis $V_a$), and then led to the second reflective surface 73c.

The light led to the second reflective surface 73b in a focused condition in this way is reflected by the reflective surface in a direction along the rotation axis $V_a$ (extension direction of the rotation axis $V_a$), and led to the third reflective surface 73d.

The light led to the third reflective surface 73d is reflected by the reflective surface in a direction of the irradiation surface 73e (direction perpendicular to (intersecting with) the rotation axis $V_a$ and a longitudinal direction of the indication member 72), and the light output from the irradiation surface 73e is introduced into the indication member 72 in a longitudinal direction of the member via the indicator light receiving surface 72d to illuminate mainly a fore side of the indication member 72. On the other hand, part of the light introduced into the light introduction member 73 passes through the first and third reflective surfaces 73b and 73d, and is introduced into the indication member 72 through the second indicator light receiving surface 72e of the indication member 72 to illuminate mainly a rear side of the indication member 72. Accordingly, the indication member 72 is illuminated in a single line without breaking.

As above, in the embodiment, the indicator 7 which has the translucent indication member (indication portion) 72 and the light introduction member (light introduction portion) 73 and is operated around an axis by the drive shaft 1 of the drive unit 2, and the light sources L which are disposed around the drive shaft 1 and illuminate the indication member 72 through the light introduction member 73 are provided; and the light introduction member 73 has the light receiving surface 73a for receiving the light from the light sources L, the first reflective surface 73b for focusing the light introduced from the light receiving surface 73a to the position of the rotation axis $V_a$ of the drive shaft 1, the second reflective surface 73c which is formed between the first reflective surface 73b and the rotation axis and reflects the light from the first reflective surface 73b in the direction along the rotation axis $V_a$, and the third reflective surface 73d which is formed on the rotation axis $V_a$ in a manner of facing the second reflective surface 73c and reflects the light from the second reflective surface 73c in the longitudinal direction of the indication member 73; thereby it is possible that the light radiated from the light sources L is temporarily focused near the rotation axis $V_a$ through the first reflective surface 73b, and then the focused light is transferred to the third reflective surface 73d as a final reflective surface via the second reflective surface 73c and supplied to the indication member 72 via the third reflective surface 73d; therefore the light from the light sources can be maximally used to improve lighting efficiency, and since a light level taken into the indication member 72 can be maintained approximately constant even if a rotation position of the indicator 7 varies, unevenness in lighting can be suppressed.

Moreover, according to the embodiment, the light receiving surface 73a is formed in the annular shape surrounding the rotation axis $V_a$ with the axis as a reference, and the first reflective surface 73b and the second reflective surface 73c are formed in the conical shape surrounding the rotation axis $V_a$ with the axis as a reference, thereby the indication member 72 that rotates with the rotation axis $V_a$ as a reference can be efficiently and approximately uniformly illuminated.

Although the first reflective surface 73b and the second reflective surface 73c were set to be the conical shape in the embodiment, for the first reflective surface 73b, any shape can be taken, as long as it can focus the light from the light receiving surface 73a near the rotation axis $V_a$, and for the second reflective surface 73c, any shape can be taken, as long as it can reflect the light from the first reflective surface 73b in a direction along the rotation axis $V_a$. For example, both of the reflective surfaces 73b, 73c may be set to be a shape based on a polygonal pyramid, or a shape formed from a plurality of flat or curved surfaces combined regularly or irregularly. Moreover, for the third reflective surface 73d, any shape can be taken, as long as it reflect the light in the longitudinal direction of the indication member 72, and in addition to the conical surface as in the embodiment, it may be set to be the shape based on a polygonal pyramid, or the shape formed from a plurality of flat or curved surfaces combined regularly or irregularly.

Moreover, according to the embodiment, the light introduction member 73 has the first part P1 having the reverse-V-shaped section that is line-symmetric with the rotation axis $V_a$ as a reference, the first reflective surface 73b is formed on the outer wall face of the first part P1 while the second reflective surface 73c is formed on the inner wall face of it, and the third reflective surface 73d is positioned at a front side of the first and second reflective surfaces 73b and 73c, thereby highly efficient and uniform lighting is ensured.

Moreover, in the embodiment, the indication member 72 and the light introduction member 73 are formed by combining separate components, thereby production of a molding die can be facilitated, or moldability of the component itself can be improved.

Moreover, in the embodiment, the connection member 71 for connecting the indicator 7 to the drive shaft 1 is arranged between the light introduction member 73 and the drive shaft 1, thereby a connection part (to the drive shaft 1) such as hole, which causes obstacle to light introduction, need not be provided, therefore light introduction efficiency can be improved by just that much.

Moreover, in the embodiment, the indication panel 5 is disposed behind the indicator 7, the light introduction member 73 is positioned at the front of the indication panel 5 together with the indication member 72, and the periphery of them is covered with the indicator cover 72 having a light shielding effect for shielding required portions of the indication member 72, thereby the light introduction member 73 need not be disposed behind the indication panel 5 for shielding the member, or need not be shielded by a special component, and a complicated configuration or increase of the number of components can be suppressed.

Although a plurality of light sources L were disposed in the embodiment, even if a single light sources is disposed, similar effects can be expected. Moreover, the light receiving surface 73a and the first and second reflective surfaces 73b, 73c were set to be a full circular shape around the rotation axis $V_a$ in the embodiment, they may be set to be a shape enclosed in partially broken or, for example, C-shaped (not fully enclosed) form in the light of a deviation angle of the indicator 7.

Figure 7:
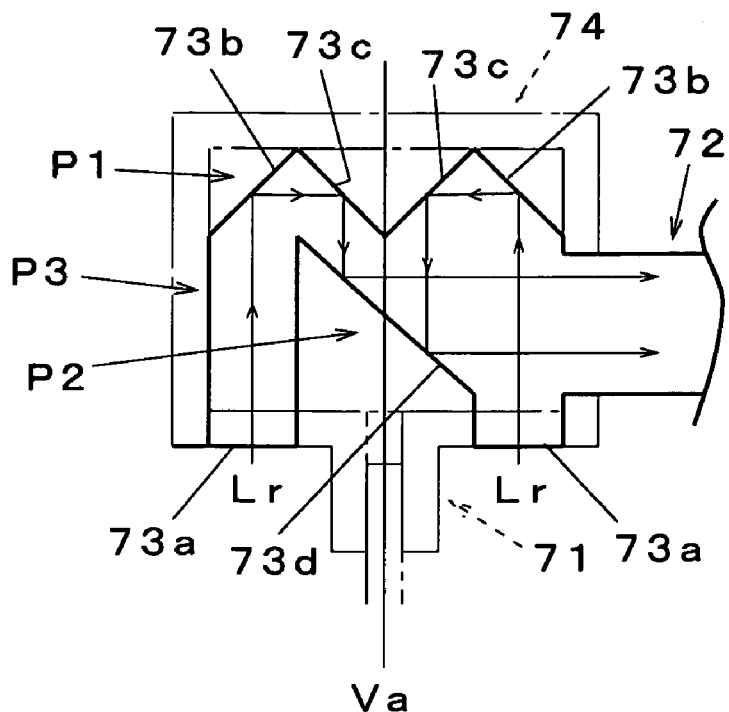
FIG. 7 is a front view showing the major portion of a second embodiment of the invention.

FIG. 7 is a front view showing the major portion of a second embodiment of the invention. In the embodiment, the light introduction member 73 and the indication member 72 are not separate components, and they are formed from a single component having a light introduction portion 73 and an indication portion 72. The light introduction portion 73 has a first part (part) P1 having a reverse-W-shaped section that is line-symmetric with a rotation axis $V_a$ as a reference, a first reflective surface 73b is formed on an outer wall face of the first part P1 while a second reflective surface 73c is formed on an inner wall face of it, and a third reflective surface 73d is positioned at a second part P2 that is a rear side of the first and second reflective surfaces 73b, 73c.

Light from light sources L1 is introduced into the indicator portion 72 along a channel from a light receiving portion 73a to the indicator portion 72 through the first reflective surface 73b, second reflective surface 73c, and third reflective surface 73d, and only the indicator portion 72 projecting from a circumferential wall portion of an indicator cover 74 is illuminated, and other portions are not illuminated.

According to such an embodiment, similar effects as in the first embodiment can be expected, and in addition, the number of components can be reduced compared with the first embodiment.

Figure 8:
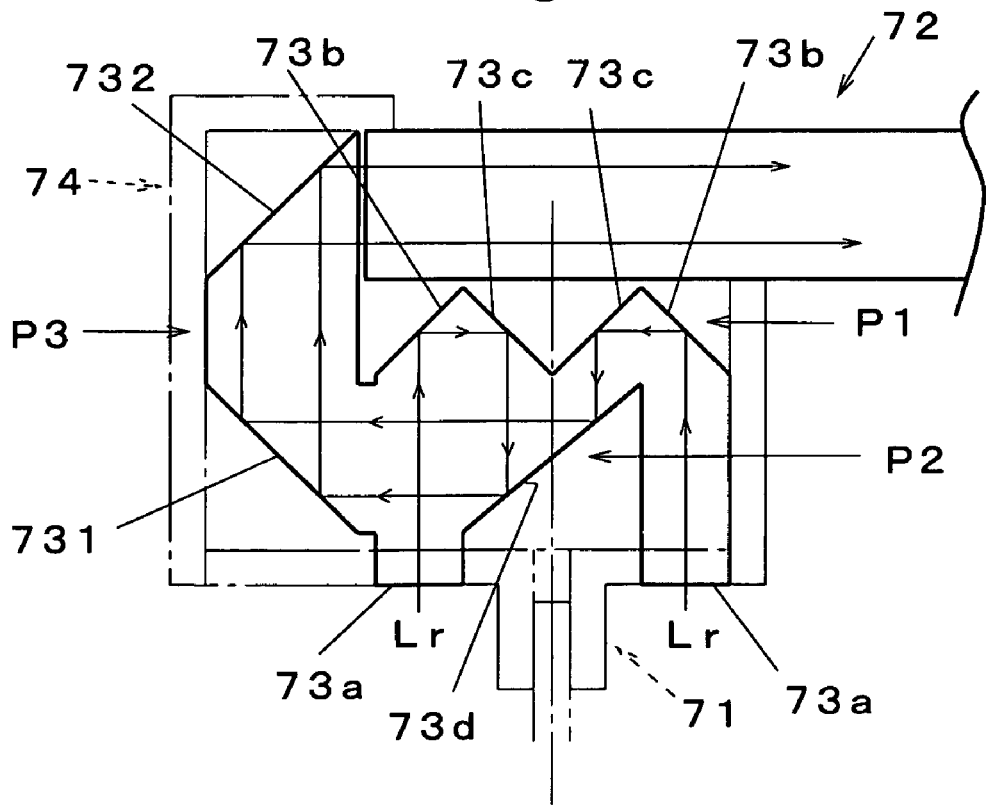
FIG. 8 is a front view showing the major portion of a third embodiment of the invention.

FIG. 8 is a front view showing the major portion of a third embodiment of the invention. In the embodiment, a third part P3 extending along a rotation axis $V_a$ is formed between a second part P2 and an indication portion 72, a fourth reflective surface 731 facing the third reflective surface 73d and a fifth reflective surface 732 facing the fourth reflective surface 731 are provided on the third part P3, and light from the third reflective surface 73d is supplied to the indication portion 72 via the fourth and fifth reflective surface 731, 732. In this case, the indication portion 72 is formed as a separate component from the third part P3, and disposed on the first part P1.

According to such an embodiment, similar effects as in the first embodiment can be expected, and in addition, an effective configuration is given when the indication portion 72 extends so as to cross a bottom wall portion of an indicator cover 74.

INDUSTRIAL APPLICABILITY

The invention can be applied to indicator lighting devices of various mobile bodies typically including motorcycles, ships, agricultural construction machines, and aircrafts, in addition to vehicles.

The invention claimed is:

1. An indicator lighting device characterized in having an indicator which has a translucent indication portion and a light introduction portion and is operated around an axis by a drive shaft of a drive unit, light sources which are disposed around the drive shaft and illuminate the indication portion through the light introduction portion; wherein the light introduction portion has a light receiving surface for receiving light from the light sources, a first reflective surface for focusing the light introduced from the light receiving surface to a rotation axis position of the drive shaft, a second reflective surface which is formed between the first reflective surface and the drive shaft and reflects the light directly from the first reflective surface in a direction along the rotation axis, and a third reflective surface which is formed on the rotation axis in a way of facing the second reflective surface and reflects the light from the second reflective surface in a longitudinal direction of the indication portion.

2. The indicator lighting device according to claim 1 characterized in that both the indication portion and the light introduction portion are formed by combining translucent, separate components.

3. The indicator lighting device according to claim 1 characterized in that the light introduction portion is connected to the drive shaft via a connection member.

4. The indicator lighting device according to claim 1 characterized in that a display panel is disposed behind the indicator, the light introduction portion is located at the front of the display panel together with the indication portion, and the periphery of them is covered with a cover having a light shielding effect.

5. An indicator lighting device having an indicator which has a translucent indication portion and a light introduction portion and is operated around an axis by a drive shaft of a drive unit, light sources which are disposed around the drive shaft and illuminate the indication portion through the light introduction portion; wherein the light introduction portion has a light receiving surface for receiving light from the light sources, a first reflective surface for focusing the light introduced from the light receiving surface to a rotation axis position of the drive shaft, a second reflective surface which is formed between the first reflective surface and the drive shaft and reflects the light from the first reflective surface in a direction along the rotation axis, and a third reflective surface which is formed on the rotation axis in a way of facing the second reflective surface and reflects the light from the second reflective surface in a longitudinal direction of the indication portion;

wherein the light receiving surface is formed in an annular form surrounding the rotation axis, and the first reflective surface and the second reflective surface are formed in a conical or polygonal shape surrounding the rotation axis.

6. The indicator lighting device according to claim 5 characterized in that both the indication portion and the light introduction portion are formed by combining translucent, separate components.

7. The indicator lighting device according to claim 5 characterized in that the light introduction portion is connected to the drive shaft via a connection member.

8. The indicator lighting device according to claim 5 characterized in that a display panel is disposed behind the indicator, the light introduction portion is located at the front of the display panel together with the indication portion, and the periphery of them is covered with a cover having a light shielding effect.

9. An indicator lighting device having an indicator which has a translucent indication portion and a light introduction portion and is operated around an axis by a drive shaft of a drive unit, light sources which are disposed around the drive shaft and illuminate the indication portion through the light introduction portion; wherein the light introduction portion has a light receiving surface for receiving light from the light sources, a first reflective surface for focusing the light introduced from the light receiving surface to a rotation axis position of the drive shaft, a second reflective surface which is formed between the first reflective surface and the drive shaft and reflects the light from the first reflective surface in a direction along the rotation axis, and a third reflective surface which is formed on the rotation axis in a way of facing the second reflective surface and reflects the light from the second reflective surface in a longitudinal direction of the indication portion;

wherein the light introduction portion has a part having a reverse-V-shaped section that is line-symmetric with the rotation axis as a reference, the first reflective surface is formed on an outer wall face of the part while the second reflective surface is formed on an inner wall face of the part, and the third reflective surface is positioned at a front side of the first and second reflective surfaces.

10. The indicator lighting device according to claim 9 characterized in that both the indication portion and the light introduction portion are formed by combining translucent, separate components.

11. The indicator lighting device according to claim 9 characterized in that the light introduction portion is connected to the drive shaft via a connection member.

12. The indicator lighting device according to claim 9 characterized in that a display panel is disposed behind the indicator, the light introduction portion is located at the front of the display panel together with the indication portion, and the periphery of them is covered with a cover having a light shielding effect.

13. An indicator lighting device having an indicator which has a translucent indication portion and a light introduction portion and is operated around an axis by a drive shaft of a drive unit, light sources which are disposed around the drive shaft and illuminate the indication portion through the light introduction portion; wherein the light introduction portion has a light receiving surface for receiving light from the light sources, a first reflective surface for focusing the light introduced from the light receiving surface to a rotation axis position of the drive shaft, a second reflective surface which is formed between the first reflective surface and the drive shaft and reflects the light from the first reflective surface in a direction along the rotation axis, and a third reflective surface which is formed on the rotation axis in a way of facing the second reflective surface and reflects the light from the second reflective surface in a longitudinal direction of the indication portion;

wherein the light introduction portion has a part having a reverse-W-shaped section that is line-symmetric with the rotation axis as a reference, the first reflective surface is formed on an outer wall face of the part while the second reflective surface is formed on an inner wall face of the part, and the third reflective surface is positioned at a rear side of the first and second reflective surfaces.

14. The indicator lighting device according to claim 13 characterized in that both the indication portion and the light introduction portion are formed by combining translucent, separate components.

15. The indicator lighting device according to claim 13 characterized in that the light introduction portion is connected to the drive shaft via a connection member.

16. The indicator lighting device according to claim 13 characterized in that a display panel is disposed behind the indicator, the light introduction portion is located at the front of the display panel together with the indication portion, and the periphery of them is covered with a cover having a light shielding effect.

* * * * *